US012067792B2

(12) United States Patent
Guo et al.

(10) Patent No.: US 12,067,792 B2
(45) Date of Patent: Aug. 20, 2024

(54) METHOD FOR DETECTING GROCERIES IN CORRIDOR, TERMINAL DEVICE AND STORAGE MEDIUM

(71) Applicant: PING AN TECHNOLOGY(SHENZHEN)CO., LTD., Guangdong (CN)

(72) Inventors: Tiying Guo, Guangdong (CN);
Weichao Liu, Guangdong (CN);
Wenfeng Lu, Guangdong (CN);
Yuanxu Chen, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 347 days.

(21) Appl. No.: 17/532,950

(22) Filed: Nov. 22, 2021

(65) Prior Publication Data
US 2022/0198812 A1    Jun. 23, 2022

Related U.S. Application Data

(63) Continuation-in-part of application No. PCT/CN2021/083397, filed on Mar. 26, 2021.

(30) Foreign Application Priority Data

Dec. 18, 2020    (CN) .......................... 202011509831.3

(51) Int. Cl.
*G06V 10/75*    (2022.01)
*G06T 7/70*    (2017.01)
(Continued)

(52) U.S. Cl.
CPC ................ *G06V 20/64* (2022.01); *G06T 7/70* (2017.01); *G06V 10/751* (2022.01); *G06V 10/761* (2022.01); *G06V 40/103* (2022.01)

(58) Field of Classification Search
CPC ...... G06V 20/64; G06V 20/52; G06V 10/751; G06V 10/761; G06V 40/103; G06T 7/70
See application file for complete search history.

(56) References Cited

U.S. PATENT DOCUMENTS

| 2006/0013439 | A1  | 1/2006 | Takeda et al. |
| 2015/0222861 | A1* | 8/2015 | Fujii ....................... G06T 11/00 348/143 |

(Continued)

FOREIGN PATENT DOCUMENTS

| CN | 103957387 A | 7/2014 |
| CN | 108932510 A | 12/2018 |

(Continued)

OTHER PUBLICATIONS

International Search Report for International Application No. PCT/CN2021/083397; Date of Completion: May 28, 2021; Date of Mailing: Jul. 1, 2021; 5 Pages.

*Primary Examiner* — Carol Wang
(74) *Attorney, Agent, or Firm* — CANTOR COLBURN LLP

(57) ABSTRACT

A method for detecting groceries in corridor is provided, this method includes: obtaining an image collected from a corridor, performing pedestrian detection and grocery detection on the image collected from the corridor to obtain a pedestrian detection result and a grocery detection result; performing, if there is a pedestrian image in the pedestrian detection result, an image processing on the image collected from the corridor according to the pedestrian image; comparing the image that is collected from the corridor and has been processed with a preset corridor image to obtain an image similarity; generating, if there is a grocery image in the grocery detection result, or if the image similarity is less than or equal to a similarity threshold, a grocery cleaning instruction according to an identifier of corridor in the image (Continued)

collected from the corridor; and sending a grocery cleaning prompt according to the grocery cleaning instruction.

18 Claims, 3 Drawing Sheets

(51) Int. Cl.
*G06V 10/74* (2022.01)
*G06V 20/64* (2022.01)
*G06V 40/10* (2022.01)

(56) References Cited

U.S. PATENT DOCUMENTS

| | | | |
|---|---|---|---|
| 2021/0049772 A1* | 2/2021 | Buibas | G06Q 30/0601 |
| 2022/0253054 A1* | 8/2022 | Li | G05D 1/0011 |

FOREIGN PATENT DOCUMENTS

| | | | | |
|---|---|---|---|---|
| CN | 105744218 B | * | 4/2019 | A47L 9/2815 |
| CN | 110619308 A | | 12/2019 | |
| CN | 111784171 A | * | 10/2020 | |

* cited by examiner

METHOD FOR DETECTING GROCERIES IN CORRIDOR, TERMINAL DEVICE AND STORAGE MEDIUM

CROSS-REFERENCE TO RELATED APPLICATION

This application is a continuation-in-part of PCT patent application Serial No. PCT/CN2021/083397, with an international filing date of Mar. 26, 2021, which claims priority to Chinese patent application No. 202011509831.3 filed with CNIPA on Dec. 18, 2020 and entitled "method and device for detecting groceries in corridor, terminal device and storage medium", the contents each of which are incorporated herein by reference thereto.

TECHNICAL FIELD

The present application relates to the technical field of applications of artificial intelligence, and particularly relates to a method for detecting groceries in corridor, a terminal device and a storage medium.

BACKGROUND

Stacking of groceries in corridor is a main reason for influencing public environment and obstructing exit passageway, the groceries stacked in corridor may bring great hidden danger to evacuation escape in case of occurrence of emergency, therefore, people are paying more and more attention to the problem of detection of groceries in corridor.

SUMMARY

As described above, cameras must be used to perform manual detection in the existing corridor grocery detection process, which causes a relatively high labor cost, moreover, the detection of groceries can not be performed all time in a manual detection manner, and a low detection efficiency of corridor groceries is caused accordingly.

In view of this, embodiments of the present application provides a method for detecting groceries in corridor, a device for detecting groceries in corridor, a terminal device and a storage medium, which aims to solve a technical problem in the prior art that the detection efficiency of groceries in corridor is low because that the detection of groceries cannot be performed all time in a manual detection manner in a detection process of groceries of corridor.

In the first aspect, one embodiment of the present application provides a method for detecting groceries in corridor, including steps of:

obtaining an image collected from a corridor, and performing a pedestrian detection and a grocery detection on the image collected from the corridor to obtain a pedestrian detection result and a grocery detection result;

performing, if there is a pedestrian image in the pedestrian detection result, an image processing on the image collected from the corridor according to the pedestrian image, wherein the pedestrian image is deleted from the image collected from the corridor through the image processing;

comparing the image that is collected from the corridor and has been processed with a preset corridor image to obtain a similarity between the image collected from the corridor and the preset corridor image;

generating, if there is a grocery image in the grocery detection result, or if the similarity between the image collected from the corridor and the preset corridor image is less than or equal to a similarity threshold, a grocery cleaning instruction according to an identifier of corridor in the image collected from the corridor; and sending a grocery cleaning prompt to the corridor corresponding to the image collected from the corridor according to the grocery cleaning instruction.

In the second aspect, one embodiment of the present application provides a terminal device, including: a memory, a processor and a computer program stored in the memory and executable by the processor, when executing the computer program, the processor is configured to implement steps of:

obtaining an image collected from a corridor, and performing a pedestrian detection and a grocery detection on the image collected from the corridor to obtain a pedestrian detection result and a grocery detection result;

performing, if there is a pedestrian image in the pedestrian detection result, an image processing on the image collected from the corridor according to the pedestrian image, wherein the pedestrian image is deleted from the image collected from the corridor through the image processing;

comparing the image that is collected from the corridor and has been processed with a preset corridor image to obtain a similarity between the image collected from the corridor and the preset corridor image;

generating, if there is a grocery image in the grocery detection result, or if the similarity between the image collected from the corridor and the preset corridor image is less than or equal to a similarity threshold, a grocery cleaning instruction according to an identifier of corridor in the image collected from the corridor; and sending a grocery cleaning prompt to the corridor corresponding to the image collected from the corridor according to the grocery cleaning instruction.

In the third aspect, one embodiment of the present application provides a storage medium which stores a computer program that, when being executed by a processor, causes the processor to implement following steps of:

obtaining an image collected from a corridor, and performing a pedestrian detection and a grocery detection on the image collected from the corridor to obtain a pedestrian detection result and a grocery detection result;

performing, if there is a pedestrian image in the pedestrian detection result, an image processing on the image collected from the corridor according to the pedestrian image, wherein the pedestrian image is deleted from the image collected from the corridor through the image processing;

comparing the image that is collected from the corridor and has been processed with a preset corridor image to obtain a similarity between the image collected from the corridor and the preset corridor image;

generating, if there is a grocery image in the grocery detection result, or if the similarity between the image collected from the corridor and the preset corridor image is less than or equal to a similarity threshold, a grocery cleaning instruction according to an identifier of corridor in the image collected from the corridor; and sending a grocery cleaning prompt to the corridor corresponding to the image collected from the corridor according to the grocery cleaning instruction.

Compared with the prior art, the advantageous effects of the embodiments of the present application are as follows: the pedestrian detection and the grocery detection are performed on the image collected from the corridor to automatically detect whether there exists a pedestrian or grocery in the corridor, and the image collected from the corridor is processed according to the pedestrian image, so that the pedestrian image is deleted from the image collected from the corridor, the interference of the pedestrian image to the image comparison between the image collected from the corridor and the preset corridor image is avoided, the accuracy of calculation of image similarity is improved, whether there exist groceries in the corridor corresponding to the image collected from the corridor may be automatically determined all time based on the image similarity and the grocery detection result, there is no need to detect the groceries in the corridor manually, and a detection efficiency of groceries in the corridor is improved.

BRIEF DESCRIPTION OF THE DRAWINGS

In order to describe the embodiments of the present application more clearly, a brief introduction regarding the accompanying drawings that need to be used for describing the embodiments of the present application or the prior art is given below; it is apparent that the accompanying drawings described below are only some embodiments of the present application, the person of ordinary skill in the art may also obtain other drawings according to the current drawings without paying creative labor.

DESCRIPTION OF THE EMBODIMENTS

In order to make the purpose, the technical solution and the advantages of the present application be clearer and more understandable, the present application will be further described in detail below with reference to the accompanying figures and the embodiments. It will be appreciated that the embodiments described in detail herein are merely intended to illustrate but not to limit the present application.

The method for detecting groceries in corridor according to the embodiments of the present application may be performed by a control device or a terminal (referred to as "mobile terminal" hereinafter).

Figure 1:
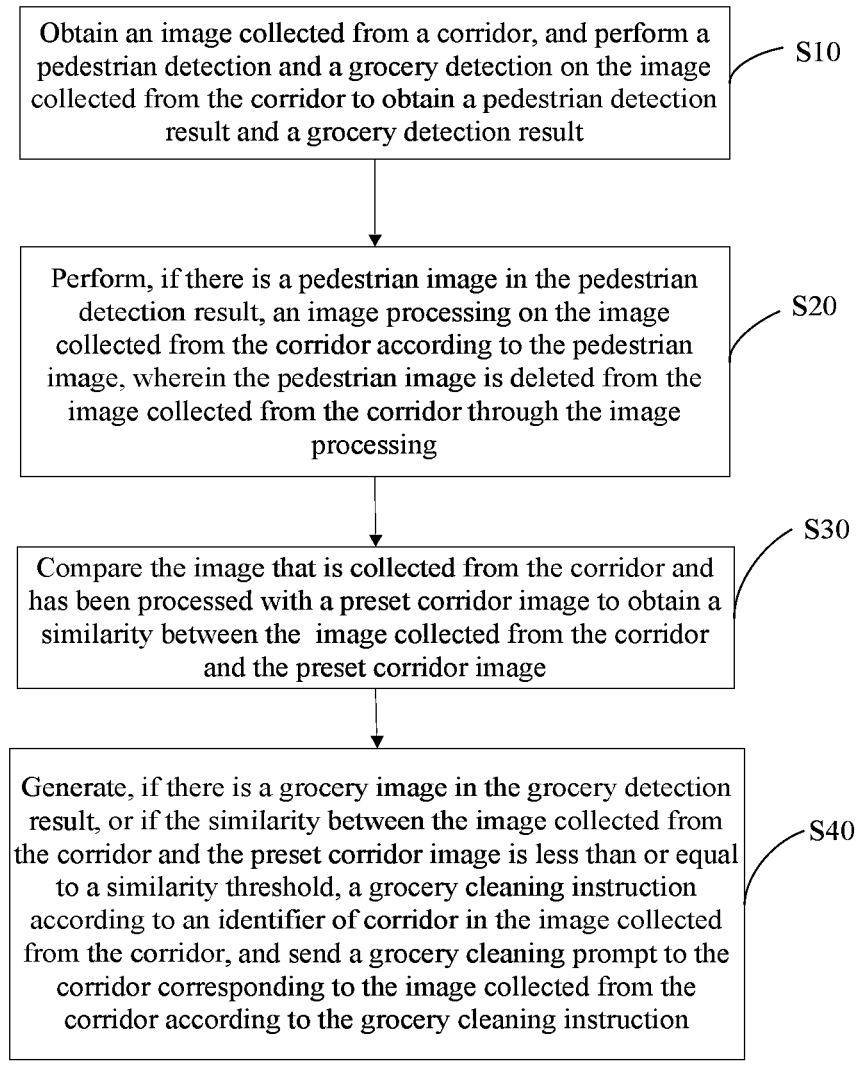
FIG. 1 illustrates a schematic diagram of implementation process of a method for detecting groceries in corridor according to one embodiment of the present application.

Referring to FIG. 1, FIG. 1 illustrates a schematic diagram of an implementation process of a method for detecting groceries in a corridor according to one embodiment of the present application, the method for detecting groceries in the corridor includes:

At step S10, obtain an image collected from the corridor, and perform a pedestrian detection and a grocery detection on the image collected from a corridor to obtain a pedestrian detection result and a grocery detection result.

In the step S10, by deploying a rotatable camera at the corridor to cover all areas of the corridor, such that an image acquisition can be performed on the corridor to obtain the image collected from the corridor;

In particular, in this step, the image collected from the corridor may be input into a preset detection model, and the preset detection model is instructed to perform pedestrian detection and grocery detection on the image collected from the corridor, thereby obtains the pedestrian detection result and the grocery detection result. The preset detection model is a pre-trained target detection module which is used to perform pedestrian detection and grocery detection on an input image, the preset detection model classifies the objects in the image collected from the corridor into pedestrians and groceries so as to determine whether there is a pedestrian or a grocery in the image collected from the corridor through image recognition; if a pedestrian is detected in the image collected from the corridor, it means that the grocery detection result includes a detected pedestrian image and a pedestrian coordinate corresponding to the pedestrian image; in this step, if a grocery is detected in the image collected from the corridor, it means that the grocery detection result includes a detected grocery image and a grocery coordinate corresponding to the grocery image.

Furthermore, in this embodiment, a database for image comparison is preset, and this database for image comparison stores standard images corresponding to different pedestrians or groceries. In this step, by comparing the standard images in the database for image comparison with the image collected from the corridor, such that the effects of pedestrian detection and grocery detection on the image collected from the corridor is achieved.

At step S20, perform an image processing on the image collected from the corridor according to the pedestrian image, if there is a pedestrian image in the pedestrian detection result.

Wherein, the image processing is used for deleting or covering the pedestrian image in the image collected from the corridor. In this step, an area to be deleted may be determined according to the pedestrian coordinate corresponding to the pedestrian image, and the image in the area to be deleted is deleted, so that an effect of deletion of the pedestrian image is achieved; furthermore, the pedestrian image in the image collected from the corridor may be covered according to a preset background image, so that an effect of image coverage of the pedestrian area is achieved.

In particular, in this step, the image processing is performed on the image collected from the corridor according to the pedestrian image, so that the pedestrian image in the image collected from the corridor is removed, interference of pedestrians to the detection of the groceries in the corridor can be effectively avoided, and the accuracy of detection of groceries in the corridor can be improved.

Optionally, in this step, said performing an image processing on the image collected from the corridor according to the pedestrian image includes:

zoom-in an image area corresponding to the pedestrian image in the image collected from the corridor to obtain an enlarged area according to a preset zoom ratio;

delete the pedestrian image in the enlarged area, and calculate an average value of pixels in the enlarged area from which the pedestrian image is deleted; and perform a color padding on an area corresponding to the pedestrian image according to the average value of pixels.

At step S30, compare the image that is collected from the corridor and has been processed with a preset corridor image to obtain similarity between the image collected from the corridor and the preset corridor image.

Wherein color histograms or values of pixel points of the image collected from the corridor and the preset corridor image are obtained respectively, and the image collected from the corridor is compared with the preset corridor image based on the color histograms or the values of pixel points, so that the similarity between the image collected from the corridor and the preset corridor image is obtained.

In this step, the preset corridor image may be set as needed, the preset corridor image is an image of the corridor without the existence of groceries and pedestrians, the similarity between the image collected from the corridor and the preset corridor image is obtained by comparing the image that is collected from the corridor and has been processed with the preset corridor image, and whether there exist a grocery in the image that is collected from the corridor and has been processed can be effectively determined based on the similarity between the image collected from the corridor and the preset corridor image.

At step S40, generate, if there exists a grocery image in the grocery detection result, or if the image similarity is less than or equal to a similarity threshold, a grocery cleaning instruction according to an identifier of corridor in the image collected from the corridor, and send a grocery cleaning prompt to the corridor corresponding to the image collected from the corridor according to the grocery cleaning instruction.

The similarity threshold may be set according to the requirements of users, and the similarity threshold is used to determine whether a difference between the image collected from the corridor and the preset corridor image, which correspond to the similarity between the image collected from the corridor and the preset corridor image, is greater than a preset difference.

Furthermore, in this step, if the similarity between the image collected from the corridor and the preset corridor image is less than or equal to the similarity threshold, the image collected from the corridor is set as a sample image and the preset detection model is trained according to the sample image, wherein when the similarity between the image collected from the corridor and the preset corridor image is less than or equal to the similarity threshold, it is determined that the image difference between the image collected from the corridor and the preset corridor image is greater than the preset difference, and the preset detection model can be used to perform a feature learning on the features in the image collected from the corridor, therefore, the image collected from the corridor is set as the sample image, and the preset detection model is trained according to the sample image, so that an accuracy of recognition of the trained preset detection model is improved.

Furthermore, in this step, when the similarity between the image collected from the corridor and the preset corridor image of the image collected from the corridor is greater than the similarity threshold, and when there is a grocery image in the grocery detection result, the image difference between the image collected from the corridor corresponding to the image similarity and the preset corridor image is determined to be less than the preset difference, there is no need to perform the feature learning on the image collected from the corridor, the grocery cleaning prompt is performed on the corridor corresponding to the image collected from the corridor according to the grocery cleaning instruction, so that a purpose of reminding a corresponding cleaner of cleaning the groceries in the corridor is achieved.

In this step, if there exists a grocery image in the grocery detection result, or if the similarity between the image collected from the corridor and the preset corridor image is less than or equal to the similarity threshold, it is determined that there exist groceries in the corridor corresponding to the image collected from the corridor.

Optionally, in this step, if there is no grocery image in the grocery detection result, and the similarity between the image collected from the corridor and the preset corridor image is less than or equal to the similarity threshold, it is determined that there is no groceries in the corridor corresponding to the image collected from the corridor, and there is no need to clean the corridor corresponding to the image collected from the corridor.

In this embodiment, the pedestrian detection and the grocery detection are performed on the image collected from the corridor so as to automatically detect whether there exists a pedestrian or a grocery in the corridor, and the image collected from the corridor is processed according to the pedestrian image, so that the pedestrian image is deleted from the image collected from the corridor, the interference of the pedestrian image to the image comparison between the image collected from the corridor and the preset corridor image is avoided, the accuracy of calculation of image similarity is improved, whether there exist groceries in the corridor corresponding to the image collected from the corridor may be automatically determined all time based on the similarity between the image collected from the corridor and the preset corridor image and the grocery detection result, there is no need to detect the groceries in the corridor manually, and a detection efficiency of groceries in the corridor is improved.

Figure 2:
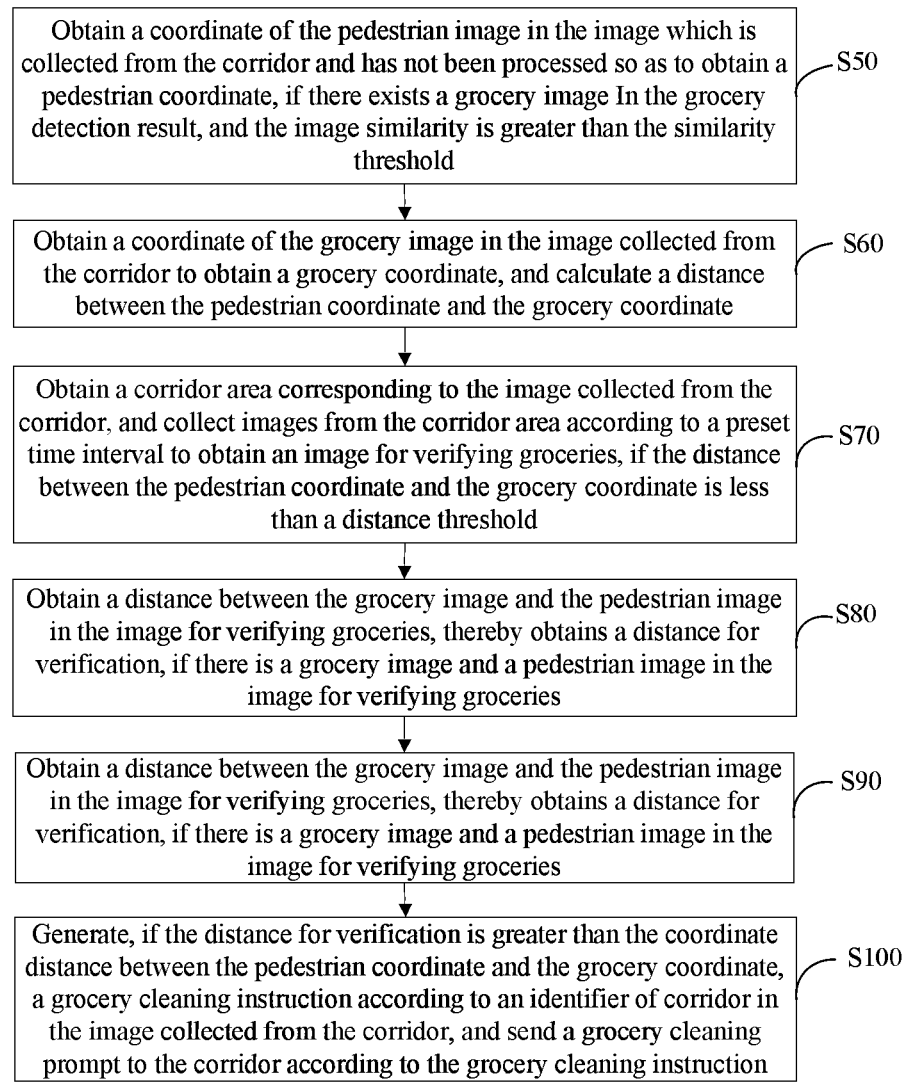
FIG. 2 illustrates a schematic diagram of implementation process of a method for detecting groceries in corridor according to another embodiment of the present application.

Referring to FIG. 2, FIG. 2 is a schematic diagram of implementation process of a method for detecting groceries in a corridor according to another embodiment of the present application. With respect to the embodiment corresponding to FIG. 1, subsequent to the step S10, the method for detecting groceries in corridor according to this embodiment further includes:

At step S50, obtain a coordinate of the pedestrian image in the image which is collected from the corridor and has not been processed, thereby obtains a pedestrian coordinate, if there exists a grocery image in the grocery detection result, and the similarity between the image collected from the corridor and the preset corridor image is greater than the similarity threshold.

Wherein, the pedestrian coordinate is a coordinate of an image center point of the corresponding pedestrian image on the image which is collected from the corridor and has not been processed, and the pedestrian coordinate is used to represent a position of the pedestrian image in the image which is collected from the corridor and has not been processed.

At step S60, obtain a coordinate of the grocery image in the image collected from the corridor to obtain a grocery coordinate, and calculate a distance between the pedestrian coordinate and the grocery coordinate.

Wherein, the grocery coordinate is the coordinate of the image center point of the grocery image on the image collected from the corridor, and is used for representing the position of the grocery image on the image collected from the corridor; in this step, by calculating the distance between the pedestrian coordinate and the grocery coordinate, the subsequent behavior analysis between the groceries and the pedestrians is effectively facilitated.

At step S70, obtain a corridor area corresponding to the image collected from the corridor, and collect images from the corridor area according to a preset time interval to obtain an image for verifying groceries, if the distance between the pedestrian coordinate and the grocery coordinate is less than a distance threshold.

The distance threshold may be set according to the requirement, the distance threshold is used to determine whether there is a carrying state between the groceries and the pedestrians in the image collected from the corridor, if the distance between the pedestrian coordinate and the grocery coordinate is less than the distance threshold, it is determined that there may be a carrying state between the groceries and the pedestrians in the image collected from the corridor; if the distance between the pedestrian coordinate and the grocery coordinate is greater than or equal to the distance threshold, it is determined that there is no carrying state between the groceries and the pedestrians in the image collected from the corridor, then, a grocery cleaning prompt is directly sent to the corridor according to the grocery cleaning instruction.

In this step, the preset time interval may be set according to the requirement, for example, the preset time interval may be set as 1 second, 3 seconds or 5 seconds, etc. Image acquisition is performed on the corridor area according to the preset time interval to obtain the image for verifying groceries, so that the determination of the carrying state between the groceries and the pedestrians in the image collected from the corridor is effectively facilitated.

At step S80, perform a pedestrian detection and a grocery detection on the image for verifying groceries.

Wherein, pedestrian detection and grocery detection are performed on the image for verifying groceries to detect whether there is a pedestrian or a grocery in the image for verifying groceries.

At step S90, obtain a distance between the grocery image and the pedestrian image in the image for verifying groceries, thereby obtains a distance for verification, if it is detected that a grocery image and a pedestrian image are coexisted in the image for verifying groceries.

Wherein a distance between the grocery image and the pedestrian image in the image for verifying groceries is obtained, and the distance for verification is obtained, so that a distance between the grocery and the pedestrian in the image for verifying groceries is calculated.

In particular, in this step, if the distance for verification is less than or equal to the distance between the pedestrian coordinate and the grocery coordinate, it is determined that a condition that a pedestrian who carries grocery may still exist in the image collected from the corridor, and image acquisition is performed on the corridor area according to the preset time interval, the image for verifying groceries is upgraded according to the image acquisition result, and continuous determination of whether there is a phenomenon of separation of pedestrians and groceries in the upgraded image for verifying groceries is achieved.

Pedestrian detection and grocery detection is performed on the upgraded image for verifying groceries, operation of image acquisition of the corridor area is stopped when it is determined that the distance for verification between the grocery image and the pedestrian image in the upgraded image for verifying groceries is greater than the distance between the pedestrian coordinate and the grocery coordinate, or if there is no grocery image or pedestrian image in the upgraded image for verifying groceries.

At step S100, generate, if the distance for verification is greater than the distance between the pedestrian coordinate and the grocery coordinate, a grocery cleaning instruction according to an identifier of corridor in the image collected from the corridor, and send a grocery cleaning prompt to the corridor corresponding to the image collected from the corridor according to the grocery cleaning instruction.

Wherein if the distance for verification is greater than the distance between the pedestrian coordinate and the grocery coordinate, it is determined that the pedestrian and the grocery in the image collected from the corridor are separated, which means that, the grocery is placed at the corridor by the pedestrian, by sending the grocery cleaning prompt to the corridor, such that a corresponding worker is reminded of cleaning the grocery.

Optionally, in this embodiment, subsequent to the step S80, the method further includes:
   obtain identifiers of pedestrians and identifiers of groceries in the image for verifying groceries and the image collected from the corridor;
   generate a grocery cleaning instruction according to the identifier of corridor in the image collected from the corridor if the identifiers of pedestrians or the identifiers of groceries of the image for verifying groceries and the image collected from the corridor are different; and
   send a grocery cleaning prompt to the corridor corresponding to the image collected from the corridor according to the grocery cleaning instruction, and acquire images from the corridor area according to the preset time interval, wherein, if the identifiers of pedestrians or the identifiers of groceries in the image for verifying groceries and the image collected from the corridor are different, it is determined that the pedestrians or the groceries between the image for verifying groceries and the image collected from the corridor are changed, the corridor corresponding to the image collected from the corridor is cleaned according to the grocery cleaning instruction, so that an occurrence of corridor detection error due to the change of the pedestrians or the groceries is avoided.

The image for verifying groceries is upgraded according to the image acquisition result, and pedestrian detection and grocery detection are performed on the upgraded image for verifying groceries, when the distance for verification, which is between the grocery image and the pedestrian image in the upgraded image for verifying groceries, is greater than the distance between the pedestrian coordinate and the grocery coordinate, or if there is no grocery image or pedestrian image in the upgraded image for verifying groceries, acquiring images from the corridor area is stopped.

In this embodiment, the distance between the pedestrian coordinate and the grocery coordinate and the distance between the grocery image and the pedestrian image in the image for verifying groceries are respectively calculated, so that the behavior analysis between the groceries and the pedestrians in the image collected from the corridor is effectively facilitated, and the accuracy of detection of groceries in the corridor is improved. In this embodiment, if the distance for verification corresponding to the upgraded image for verifying groceries is always less than or equal to the distance between the pedestrian coordinate and the grocery coordinate, it is determined that the grocery in the image collected from the corridor is carried by the pedestrian, there is no need to send the grocery cleaning prompt to the corridor corresponding to the image collected from the corridor, so that the accuracy of detection of groceries in the corridor is improved.

In all embodiments of the present application, pedestrian detection and grocery detection are performed on the image collected from the corridor to obtain a pedestrian detection result and a grocery detection result, in particular, the pedestrian detection result and the grocery detection result are obtained by performing pedestrian detection and grocery detection on the image collected from the corridor. The pedestrian detection result and the grocery detection result are uploaded to a blockchain, so that the securities of the pedestrian detection result and the grocery detection result, and the fairness and the transparency to the user may be ensured. The pedestrian detection result and the grocery detection result may be downloaded by a user device from the blockchain, such that whether the pedestrian detection result and the grocery detection result have been tampered can be verified. The blockchain in the embodiments refers to a new application mode of computer technologies such as distributed data storage, point-to-point transmission, consensus mechanism, encryption algorithm, and the like. Blockchain is essentially a decentralized database which is constituted of a series of data blocks, and the blockchain is generated by associating these data blocks using cryptographic methods, each of these data blocks contains information of a batch of network transactions which are used for verifying the validity (anti-counterfeiting) of the information and generating a next data block. The blockchain may include a blockchain bottom layer platform, a platform product service layer, and an application service layer, etc.

Figure 3:
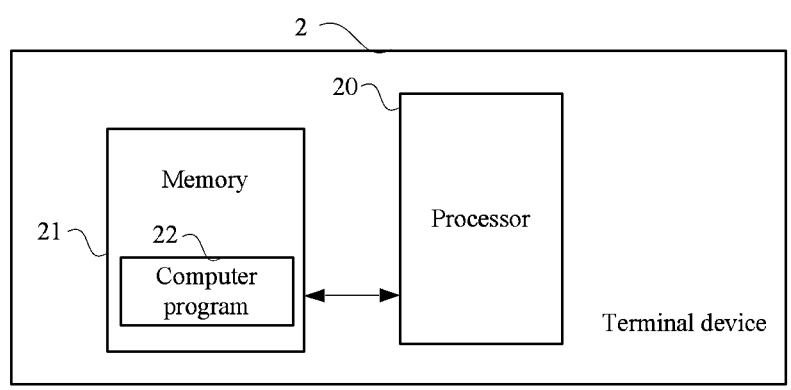
FIG. 3 illustrates a structural block diagram of a terminal device according to one embodiment of the present application.

FIG. 3 depicts a structural block diagram of a terminal device 2 according to another embodiment of the present application. As shown in FIG. 3, the terminal device 2 in this embodiment includes a processor 20, a memory 21, and a computer program 22 stored in the memory 21 and executable by the processor 20, the computer program 22 may be such as a program of the method for detecting groceries in corridor. When executing the computer program 23, the processor 20 is configured to implement steps of:

obtaining an image collected from a corridor, and performing a pedestrian detection and a grocery detection on the image collected from the corridor to obtain a pedestrian detection result and a grocery detection result;

performing, if there is a pedestrian image in the pedestrian detection result, an image processing on the image collected from the corridor according to the pedestrian image, wherein the pedestrian image is deleted from the image collected from the corridor through the image processing;

comparing the image which is collected from the corridor and has been processed with a preset corridor image to obtain a similarity between the image collected from the corridor and the preset corridor image;

generating, if there is a grocery image in the grocery detection result, or if the similarity between the image collected from the corridor and the preset corridor image is less than or equal to a similarity threshold, a grocery cleaning instruction according to an identifier of corridor in the image collected from the corridor; and sending a grocery cleaning prompt to the corridor corresponding to the image collected from the corridor according to the grocery cleaning instruction.

For example, the computer program 22 may be divided into one or a plurality of units, the one or plurality units are stored in the memory 21 and are executed by the processor 20 so as to implement the present application. The one or plurality of modules/units may be a series of computer program instruction segments that can accomplish particular functionalities, these instruction segments are used for describing an executive process of the computer program 22 in the terminal device 2. The computer program 22 may be divided into the corridor acquisition unit 10, the image processing unit 11, the image comparison unit 12, the grocery cleaning prompting unit 13 and the grocery verification unit 14, regarding the functions of these various units, reference can be made to the above descriptions.

The terminal device 2 may include but is not limited to: the processor 20, and the memory 21. The person of ordinary skill in the art may be aware of the fact that, FIG. 4 is merely an example of the terminal device 2, and is not constituted as limitation to the terminal device 2, more or less components than the components shown in FIG. 3 may be included, or some components or different components may be combined; for example, the terminal device 2 may also include an input and output device, a network access device, a bus, etc.

The so called processor 20 may be CPU (Central Processing Unit), and may also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor may be a microprocessor, as an alternative, the processor may also be any conventional processor, and the like.

The memory 21 may be an internal storage unit of the terminal device 2, such as a hard disk or a memory of the terminal device 2. The memory 21 may also be an external storage device of the terminal device 2, such as a plug-in hard disk, a SMC (Smart Media Card), a SD (Secure Digital) card, a FC (Flash Card) equipped on the terminal device 2. Furthermore, the memory 21 may not only include the internal storage unit of the terminal device 2 but also include the external memory of the terminal device 2. The memory 21 is configured to store the computer program and other procedures and data needed by the terminal device 2. The memory 21 may also be configured to store data that has been output or being ready to be output temporarily.

A computer readable storage medium is further provided in one embodiment of the present application, the computer readable storage medium may be volatile or non-volatile and stores a computer program, the computer program includes a program instruction, the processor is configured to execute the program instruction to implement steps of:

obtaining an image collected from a corridor, and performing a pedestrian detection and a grocery detection on the image collected from the corridor to obtain a pedestrian detection result and a grocery detection result;

performing, if there is a pedestrian image in the pedestrian detection result, an image processing on the image collected from the corridor according to the pedestrian image, wherein the pedestrian image is deleted from the image collected from the corridor through the image processing;

comparing the image collected from the corridor with a preset corridor image to obtain a similarity between the image collected from the corridor and the preset corridor image;

generating, if there is a grocery image in the grocery detection result, or if the similarity between the image collected from the corridor and the preset corridor image is less than or equal to a similarity threshold, a grocery cleaning instruction according to an identifier of corridor in the image collected from the corridor; and sending a grocery cleaning prompt to the corridor corresponding to the image collected from the corridor according to the grocery cleaning instruction.

The aforesaid embodiments are only intended to explain but not to limit the technical solutions of the present application. Although the present application has been explained in detail with reference to the aforesaid embodiments, a person of ordinary skilled in the art will be appreciated that, the technical solutions disclosed in the embodiments may also be amended, some technical features in the technical solutions may also be equivalently substituted; the amendments or the equivalent substitutions, which don't cause the essence of corresponding technical solution to be broken away from the spirit and the scope of the technical solutions in the various embodiments of the present application, should all be included in the protection scope of the present application.

What is claimed is:

1. A method for detecting groceries in a corridor, being performed by a mobile terminal, comprising steps of:
    obtaining an image collected from the corridor, and performing a pedestrian detection and a grocery detection on the image collected from the corridor to obtain a pedestrian detection result and a grocery detection result;
    performing, if there is a pedestrian image in the pedestrian detection result, image processing on the image collected from the corridor according to the pedestrian image, wherein the pedestrian image is deleted from the image collected from the corridor through the image processing;
    comparing the image that is collected from the corridor and that has been processed with a preset corridor image to obtain a similarity between the image collected from the corridor and the preset corridor image;
    generating, if there is a grocery image in the grocery detection result, or if the similarity between the image collected from the corridor and the preset corridor image is less than or equal to a similarity threshold, a grocery cleaning instruction according to an identifier of the corridor in the image collected from the corridor; and
    sending a grocery cleaning prompt to the corridor corresponding to the image collected from the corridor according to the grocery cleaning instruction.

2. The method according to claim 1, wherein after the step of comparing the image that is collected from the corridor and that has been processed with the preset corridor image to obtain the similarity between the image collected from the corridor and the preset corridor image, the method further comprises:
    obtaining, if the similarity between the image collected from the corridor and the preset corridor image is greater than a similarity threshold, a coordinate of the pedestrian image in the image that is collected from the corridor and that has not been processed, thereby obtaining a pedestrian coordinate;
    obtaining a coordinate of the grocery image in the image collected from the corridor to obtain a grocery coordinate, and determining a distance between the pedestrian coordinate and the grocery coordinate;
    obtaining, if the distance between the pedestrian coordinate and the grocery coordinate is less than a distance threshold, a corridor area corresponding to the image collected from the corridor and collecting images from the corridor area according to a preset time interval to obtain an image for verifying groceries;
    performing the pedestrian detection and the grocery detection on the image for verifying groceries;
    obtaining, if it is detected that there is a grocery image and a pedestrian image in the image for verifying groceries, a distance which is between the grocery image and the pedestrian image in the image for verifying groceries, thereby obtaining a distance for verification;
    generating, if the distance for verification is greater than the distance between the pedestrian coordinate and the grocery coordinate, the grocery cleaning instruction according to the identifier of the corridor in the image collected from the corridor; and
    sending the grocery cleaning prompt to the corridor corresponding to the image collected from the corridor according to the grocery cleaning instruction.

3. The method according to claim 2, wherein after the step of obtaining the distance which is between the grocery image and the pedestrian image in the image for verifying groceries to obtain the distance for verification, the method further comprises:
    collecting, if the distance for verification is less than or equal to the distance between the pedestrian coordinate and the grocery coordinate, images from the corridor area according to the preset time interval and upgrading the image for verifying groceries according to an image acquisition result;
    performing the pedestrian detection and the grocery detection on the upgraded image for verifying groceries, and stopping a step of acquiring images from the corridor area if a distance for verification which is between a grocery image and a pedestrian image in the upgraded image for verifying groceries is determined to be greater than the distance between the pedestrian coordinate and the grocery coordinate, or if there is no grocery image or pedestrian image in the upgraded image for verifying groceries.

4. The method according to claim 2, further comprising:
    obtaining identifiers of pedestrians and identifiers of groceries in the image for verifying groceries and the image collected from the corridor;
    generating, if the identifiers of the pedestrians or the identifiers of the groceries in the image for verifying groceries and the image collected from the corridor are different, the grocery cleaning instruction according to the identifier of the corridor in the image collected from the corridor;
    sending the grocery cleaning prompt to the corridor corresponding to the image collected from the corridor according to the grocery cleaning instruction, and acquiring images from the corridor area according to the preset time interval; and
    upgrading the image for verifying groceries according to an image acquisition result, and performing the pedestrian detection and the grocery detection on the upgraded image for verifying groceries, and stopping the acquiring of the images from the corridor area if a distance for verification which is between a grocery image and a pedestrian image in the upgraded image for verifying groceries is determined to be greater than the distance between the pedestrian coordinate and the grocery coordinate, or if there is no grocery image or pedestrian image in the upgraded image for verifying groceries.

5. The method according to claim 1, wherein the step of performing the image processing on the image collected from the corridor according to the pedestrian image comprises:

zooming-in an image area corresponding to the pedestrian image in the image collected from the corridor according to a preset zoom ratio to obtain an enlarged image area;

deleting the pedestrian image in the enlarged image area, and determining an average value of pixels of an image in the enlarged image area from which the pedestrian image is deleted; and performing, according to the average value of the pixels, a color padding on an area corresponding to the pedestrian image in the enlarged image area.

6. The method according to claim 1, wherein the step of performing the pedestrian detection and the grocery detection on the image collected from the corridor to obtain the pedestrian detection result and the grocery detection result comprises:

inputting the image collected from the corridor into a preset detection model, wherein the preset detection model is a trained target detection model which serves to perform the pedestrian detection and the grocery detection on an input image; and instructing the preset detection model to perform the pedestrian detection and the grocery detection on the image collected from the corridor to obtain the pedestrian detection result and the grocery detection result.

7. The method according to claim 6, further comprising:

setting the image collected from the corridor as a sample image, and performing a training on the preset detection model according to the sample image, if the similarity between the image collected from the corridor and the preset corridor image is less than or equal to the similarity threshold.

8. A terminal device, comprising: a memory, a processor and a computer program stored in the memory and executable by the processor, wherein when executing the computer program, the processor is configured to implement steps of:

obtaining an image collected from a corridor, and performing a pedestrian detection and a grocery detection on the image collected from the corridor to obtain a pedestrian detection result and a grocery detection result;

performing, if there is a pedestrian image in the pedestrian detection result, image processing on the image collected from the corridor according to the pedestrian image, wherein the pedestrian image is deleted from the image collected from the corridor through the image processing;

comparing the image that is collected from the corridor and that has been processed with a preset corridor image to obtain a similarity between the image collected from the corridor and the preset corridor image;

generating, if there is a grocery image in the grocery detection result, or if the similarity between the image collected from the corridor and the preset corridor image is less than or equal to a similarity threshold, a grocery cleaning instruction according to an identifier of the corridor in the image collected from the corridor; and sending a grocery cleaning prompt to the corridor corresponding to the image collected from the corridor according to the grocery cleaning instruction.

9. The terminal device according to claim 8, wherein after the step of comparing the image that is collected from the corridor and that has been processed with the preset corridor image to obtain a similarity between the image collected from the corridor and the preset corridor image, the processor is further configured to execute the computer program to perform steps of:

obtaining, if the similarity between the image collected from the corridor and the preset corridor image is greater than a similarity threshold, a coordinate of the pedestrian image in the image that is collected from the corridor and that has not been processed, thereby obtaining a pedestrian coordinate;

obtaining a coordinate of the grocery image in the image collected from the corridor to obtain a grocery coordinate, and determining a distance between the pedestrian coordinate and the grocery coordinate;

obtaining, if the distance between the pedestrian coordinate and the grocery coordinate is less than a distance threshold, a corridor area corresponding to the image collected from the corridor and collecting images from the corridor area according to a preset time interval to obtain an image for verifying groceries;

performing the pedestrian detection and the grocery detection on the image for verifying groceries; and obtaining, if it is detected that there is a grocery image and a pedestrian image in the image for verifying groceries, a distance which is between the grocery image and the pedestrian image in the image for verifying groceries to obtain a distance for verification;

generating, if the distance for verification is greater than the distance between the pedestrian coordinate and the grocery coordinate, the grocery cleaning instruction according to the identifier of the corridor in the image collected from the corridor; and sending the grocery cleaning prompt to the corridor corresponding to the image collected from the corridor according to the grocery cleaning instruction.

10. The terminal device according to claim 9, wherein after the step of obtaining the distance which is between the grocery image and the pedestrian image in the image for verifying groceries, thereby obtaining the distance for verification, the processor is further configured to execute the computer program to perform steps of:

collecting, if the distance for verification is less than or equal to the distance between the pedestrian coordinate and the grocery coordinate, images from the corridor area according to the preset time interval and upgrading the image for verifying groceries according to an image acquisition result; and performing the pedestrian detection and the grocery detection on the upgraded image for verifying groceries, and stopping a step of acquiring images from the corridor area if a distance for verification which is between a grocery image and a pedestrian image in the upgraded image for verifying groceries is determined to be greater than a coordinate distance, or if there is no grocery image or pedestrian image in the upgraded image for verifying groceries.

11. The terminal device according to claim 9, wherein the processor is further configured to execute the computer program to perform steps of:

generating, if identifiers of pedestrians or the identifiers of groceries in the image for verifying groceries and the image collected from the corridor are different, the grocery cleaning instruction according to the identifier of the corridor in the image collected from the corridor;

sending the grocery cleaning prompt to the corridor corresponding to the image collected from the corridor according to the grocery cleaning instruction, and acquiring images from the corridor area according to the preset time interval; and upgrading the image for verifying groceries according to an image acquisition result, and performing the pedestrian detection and the grocery detection on the upgraded image for verifying groceries, and stopping the acquiring of the images from the corridor area if a distance for verification which is between a grocery image and a pedestrian image in the upgraded image for verifying groceries is determined to be greater than a coordinate distance, or if there is no grocery image or pedestrian image in the upgraded image for verifying groceries.

12. The terminal device according to claim 8, wherein the processor is configured to perform the step of performing the image processing on the image collected from the corridor according to the pedestrian image by:

zooming-in an image area corresponding to the pedestrian image in the image collected from the corridor according to a preset zoom ratio, thereby obtaining an enlarged image area;

deleting the pedestrian image in the enlarged image area, and determining an average value of pixels of an image in the enlarged image area from which the pedestrian image is deleted; and performing, according to the average value of the pixels, a color padding on an area corresponding to the pedestrian image in the enlarged image area.

13. A non-transitory computer-readable storage medium, wherein the non-transitory computer-readable storage medium stores a computer program that, when being executed by a processor, causes the processor to implement steps of:

obtaining an image collected from a corridor, and performing a pedestrian detection and a grocery detection on the image collected from the corridor to obtain a pedestrian detection result and a grocery detection result;

performing, if there is a pedestrian image in the pedestrian detection result, image processing on the image collected from the corridor according to the pedestrian image, wherein the pedestrian image is deleted from the image collected from the corridor through the image processing;

comparing the image that is collected from the corridor and that has been processed with a preset corridor image to obtain a similarity between the image collected from the corridor and the preset corridor image;

generating, if there is a grocery image in the grocery detection result, or if the similarity between the image collected from the corridor and the preset corridor image is less than or equal to a similarity threshold, a grocery cleaning instruction according to an identifier of the corridor in the image collected from the corridor; and sending a grocery cleaning prompt to the corridor corresponding to the image collected from the corridor according to the grocery cleaning instruction.

14. The non-transitory computer-readable storage medium according to claim 13, wherein after the step of comparing the image that is collected from the corridor and that has been processed with the preset corridor image to obtain the similarity between the image collected from the corridor and the preset corridor image, the computer program is further configured to, when being executed by the processor, cause the processor to implement steps of:

obtaining, if the similarity between the image collected from the corridor and the preset corridor image is greater than a similarity threshold, a coordinate of the pedestrian image in the image that is collected from the corridor and that has not been processed, thereby obtaining a pedestrian coordinate;

obtaining a coordinate of the grocery image in the image collected from the corridor to obtain a grocery coordinate, and determining a distance between the pedestrian coordinate and the grocery coordinate;

obtaining, if the distance between the pedestrian coordinate and the grocery coordinate is less than a distance threshold, a corridor area corresponding to the image collected from the corridor and collecting images from the corridor area according to a preset time interval, thereby obtaining an image for verifying groceries;

performing the pedestrian detection and the grocery detection on the image for verifying groceries;

obtaining, if it is detected that there is a grocery image and a pedestrian image in the image for verifying groceries, a distance which is between the grocery image and the pedestrian image in the image for verifying groceries to obtain a distance for verification;

generating, if the distance for verification is greater than a coordinate distance, the grocery cleaning instruction according to the identifier of the corridor in the image collected from the corridor; and sending the grocery cleaning prompt to the corridor corresponding to the image collected from the corridor according to the grocery cleaning instruction.

15. The non-transitory computer-readable storage medium according to claim 14, wherein after the step of obtaining the distance which is between the grocery image and the pedestrian image in the image for verifying groceries to obtain the distance for verification, the computer program is further configured to, when being executed by the processor, cause the processor to implement steps of:

collecting, if the distance for verification is less than or equal to the distance between the pedestrian coordinate and the grocery coordinate, images from the corridor area according to the preset time interval and upgrading the image for verifying groceries according to an image acquisition result; and performing the pedestrian detection and the grocery detection on the upgraded image for verifying groceries, and stopping a step of acquiring images from the corridor area if a distance for verification which is between a grocery image and a pedestrian image in the upgraded image for verifying groceries is determined to be greater than the distance between the pedestrian coordinate and the grocery coordinate, or if there is no grocery image or pedestrian image in the upgraded image for verifying groceries.

16. The non-transitory computer-readable storage medium according to claim 14, wherein the computer program is further configured to, when being executed by the processor, cause the processor to implement steps of:

obtaining identifiers of pedestrians and identifiers of groceries in the image for verifying groceries and the image collected from the corridor;

generating, if the identifiers of the pedestrians or the identifiers of the groceries in the image for verifying groceries and the image collected from the corridor are different, the grocery cleaning instruction according to the identifier of the corridor in the image collected from the corridor;

sending the grocery cleaning prompt to the corridor corresponding to the image collected from the corridor according to the grocery cleaning instruction, and acquiring images from the corridor area according to the preset time interval; and upgrading the image for verifying groceries according to an image acquisition result, and performing the pedestrian detection and the grocery detection on the upgraded image for verifying groceries, and stopping the acquiring of the images from the corridor area if a distance for verification which is between a grocery image and a pedestrian image in the upgraded image for verifying groceries is determined to be greater than the distance between the pedestrian coordinate and the grocery coordinate, or if there is no grocery image or pedestrian image in the upgraded image for verifying groceries.

17. The non-transitory computer-readable storage medium according to claim 13, wherein the computer program is configured to, when being executed by the processor, cause the processor to implement the step of performing the image processing on the image collected from the corridor according to the pedestrian image by:

zooming-in an image area corresponding to the pedestrian image in the image collected from the corridor according to a preset zoom ratio to obtain an enlarged image area;

deleting the pedestrian image in the enlarged image area, and determining an average value of pixels of an image in the enlarged image area from which the pedestrian image is deleted; and performing, according to the average value of the pixels, a color padding on an area corresponding to the pedestrian image in the enlarged image area.

18. The non-transitory computer-readable storage medium according to claim 13, wherein the computer program is configured to, when being executed by the processor, cause the processor to implement the step of performing the pedestrian detection and the grocery detection on the image collected from the corridor to obtain the pedestrian detection result and the grocery detection result by:

inputting the image collected from the corridor into a preset detection model, wherein the preset detection model is a trained target detection model which serves to perform the pedestrian detection and the grocery detection on an input image; and instructing the preset detection model to perform the pedestrian detection and the grocery detection on the image collected from the corridor to obtain the pedestrian detection result and the grocery detection result.

* * * * *